Nov. 20, 1923.
C. ROSEL
HEDGE AND GRASS TRIMMER
Filed Jan. 11, 1922
1,474,916
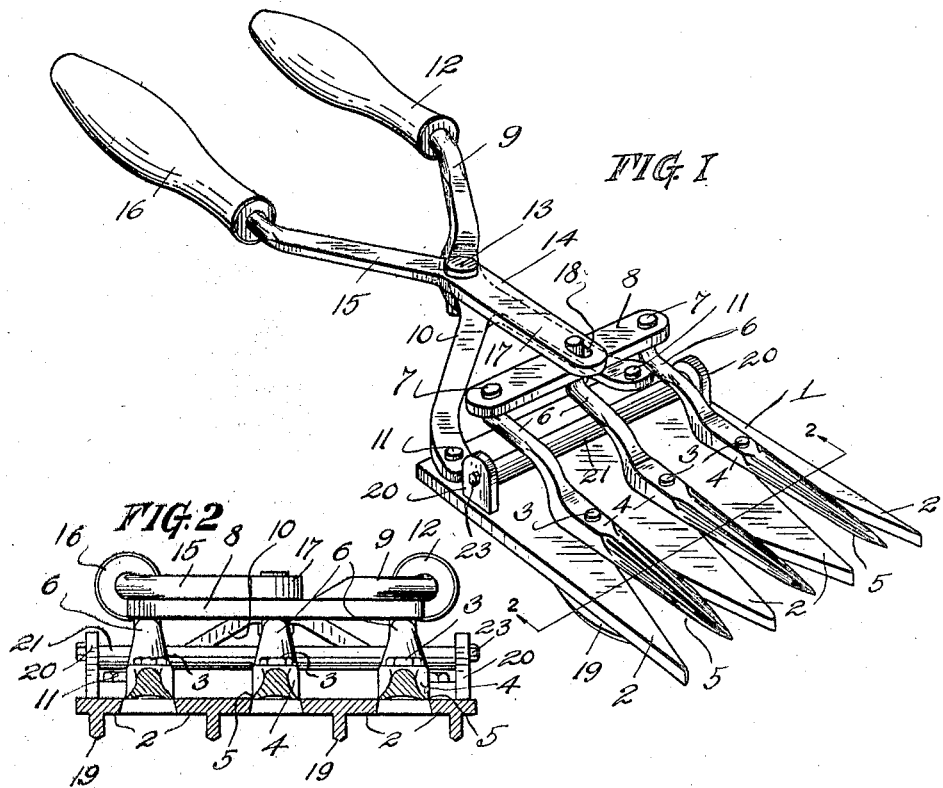
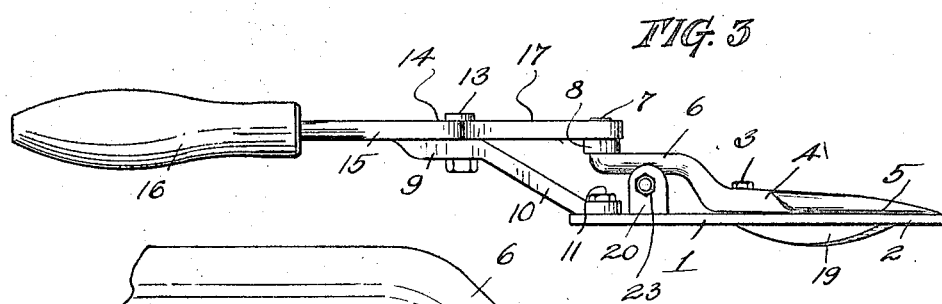
Inventor
Charles Rosel
By C. C. Shepherd
Attorney Patented Nov. 20, 1923.

1,474,916

UNITED STATES PATENT OFFICE.

CHARLES ROSEL, OF NEWARK, OHIO.

HEDGE AND GRASS TRIMMER.

Application filed January 11, 1922. Serial No. 528,361.

*To all whom it may concern:*

Be it known that I, CHARLES ROSEL, a citizen of the United States, residing at Newark, in the county of Licking and State of Ohio, have invented certain new and useful Improvements in Hedge and Grass Trimmers, of which the following is a specification.

This invention relates to an improved hedge and grass trimmer, employed as a hand operating tool for conveniently and neatly cutting lawn edges, shrubbery, plants and the like.

An object of the invention resides in the provision of an implement for the purpose stated which includes a base plate having the forward edge thereof formed to include guide teeth, having the upper surfaces thereof arranged to cooperate with pivotally mounted, uniformly movable cutters, hand operated mechanism of a novel character being provided for effecting the oscillation of the cutters across the edges of the guide teeth to sever the matter positioned between said teeth during the operation of the trimmer.

Another object of the invention rests in pivotally connecting the cutters to the base plate at positions immediately in the rear of the guide teeth, and terminating the rear ends of said cutters in upstanding arms disposed on a plane above the base plate, the rear ends of said arms being connected for uniform oscillation by a transversely extending link adapted to be oscillated by the forward end of a pivoted actuating lever, the latter constituting a part of the handle structure of the trimmer.

A further object of the invention rests in forming the trimmer with a handle structure which includes a stationary handle having a forked forward end adapted to be rigidly connected with the rear portion of the base plate and in pivotally connecting the stationary handle with a movable oscillatory handle construction, pivoted to the stationary handle immediately to the rear of the forked extremity of the latter, the forward end of the movable handle terminating in a lever extremity arranged for pivotal connection with the transverse bar of the cutters, said handles terminating in spaced relationship so that the same may be employed by the operator to provide a substantial supporting means for the trimmer and at the same time permit of the convenient oscillation of the movable cutters.

Still further object of the invention rests in providing an eccentric adjusting mechanism between the elevated arms of the cutters, so that the frictional pressure between said cutters and the upper surface of the base plate may be adjusted to conform the trimmer to the work at hand.

With these and other objects in view, as will appear as the description proceeds, the invention accordingly consists in the novel features of construction, combinations of elements and arrangements of parts, hereinafter to be fully described and particularly pointed out in the appended claim.

In the accompanying drawings:

Figure 1 is a perspective view of the improved hedge and grass trimmer comprising the present invention.

Figure 2 is a transverse sectional view taken through the trimmer on the line 2—2 of Figure 1.

Figure 3 is a side elevation of the trimmer, and,

Figure 4 is a detail perspective view showing the eccentric adjusting mechanism for the cutters of the trimmer.

Similar characters of reference denote like and corresponding parts throughout the several views of the drawing.

Referring more particularly to the details of the invention, my improved trimmer consists of a metallic base plate 1, of any suitable size or thickness. The forward edge of this plate is formed to include a plurality of substantially V shaped guide teeth 2, which provide between them V shaped guides into which the grass or other material to be cut is adapted to be forced during the process of operating the trimmer. Pivotally mounted as at 3 upon the upper surface of the base plate 1 is a plurality of cutters 4. These cutters, as shown in Figure 2, are hollow ground so as to provide sharpened cutting edges 5, which are adapted to be forced into engagement with the upper surfaces of the plate 1, whereby upon the oscillation of the cutters the said edges 5 will in a wiping manner be forced across the edges of the teeth 2, so, in a scissor like manner, as to effectively sever the grass or other matter positioned between the teeth.

The said cutters 4 each terminate to the rear of the pivotal mounting 3 thereof in an upstanding arm 6, which is disposed in a horizontal plane above the base plate 1, and the arms 6 of said cutters, in turn, terminate in upstanding pins 7, which are substantially vertically arranged and are adapted to be received within spaced openings formed in the transverse connecting bar or link 8, the said link being employed to connect the cutters for uniform and simultaneous oscillation. To manually oscillate the cutters in a controlled and convenient manner and support the base plate, there is provided a handle structure which consists of a stationary arm 9, having a forwardly located forked extremity 10, which is secured rigidly as at 11 to the upper surface of the plate 1 contiguous to the rear edge of the latter. The arm 9 extends generally rearwardly and angularly with respect to the longitudinal edges or center line of the plate 1, and terminates at its rear end in a handle 12, disposed to extend parallel to the longitudinal center line of the base plate. Pivotally mounted as at 13 upon the arm 9 is an actuating lever 14 which includes an angularly extending portion 15 arranged to extend in diverging relationship with respect to the arm 9 and to diverge with respect to the longitudinal center line of the base plate 1, the rear end of the portion 15 terminating in a handle 16, which is disposed to extend substantially parallel to and in transversely spaced relationship with the handle 12. Obviously, these handles may be supported by the grasp of the operator to control the movements of the trimmer and likewise, the lever 14 may be oscillated about its pivot 13 to oscillate the cutters. This is accomplished by forming the forward end of the lever 14 with a straight portion 17 extending substantially in parallelism with the longitudinal center line of the base plate, the forward end of the portion 17 being terminated to include an elongated slot 18, which receives the pin 7 of the central cutter 4, which pin is extended to not only protrude through the link or bar 8, but also to extend into the slot 18. By this construction, it will be manifest that the cutters may be readily and conveniently operated in a uniform and simultaneous manner to produce a sharp clean cutting action. The under surfaces of the teeth 2 may be formed with integral segmental guides 19, which will space the forward edges of the teeth from the ground or other surface over which the trimmer operates.

A final important feature in the present invention resides in the provision of means for controlling the relationship between the cutting edges 5 and the upper surface of the plate 1. This is accomplished by providing the plate 1 with upstanding integral lugs or ears 20, which rotatably receive between them a rod 21, having the ends thereof formed with eccentrically situated pintles 22, rotatably received within the ears 20. The pintles 22 terminate in heads 23 capable of receiving a suitable tool by means of which the rod 21 may be rotated. By this construction, an eccentric adjustment is provided for forcing the forward edges of the cutters into more or less firm engagement with the teeth 2, controlling largely the operation of said cutters and adapting the same to the particular work at hand. For example, it is desirable that when cutting grass, a close engagement exists between the edges 5 and the teeth 2, whereas in cutting hedges or similar coarse material, such close engagement is not needed.

In view of the foregoing description, taken in conjunction with the accompanying sheet of drawing, it will be seen that the present invention provides an implement of simple and durable construction which may be admirably employed for performing the dual cutting operation set forth. By its construction, the tool may be conveniently operated, supported and advanced into engagement with the materials to be severed. While the preferred form of the invention has been described, nevertheless it will be understood that the form of the implement may be changed in minor structural particulars without departing from the spirit of the invention or the scope of the following claim.

What is claimed is:

A trimmer comprising a base plate having guide teeth formed therewith, pivotally mounted cutters provided upon said base plate and arranged to oscillate over said teeth, said cutters terminating in arms disposed above said base plate, an eccentrically mounted rod carried by said base plate and arranged for engagement with said arms to govern the frictional relationship between said cutters and the upper surface of said plate.

In testimony whereof I affix my signature.

CHARLES ROSEL.